(12) United States Patent
Riehl et al.

(10) Patent No.: US 11,131,563 B2
(45) Date of Patent: Sep. 28, 2021

(54) SYSTEM FOR DETECTING THE POSITION OF A LINEAR UNIT OF A LINEAR SYSTEM

(71) Applicant: SKF MOTION TECHNOLOGIES AB, Gothenburg (SE)

(72) Inventors: Christoph Riehl, Leymen (FR); Martin Scholer, Bartenheim (FR)

(73) Assignee: SKF Motion Technologies AB, Gothenburg (SE)

( * ) Notice: Subject to any disclaimer, the term of this patent is extended or adjusted under 35 U.S.C. 154(b) by 153 days.

(21) Appl. No.: 16/554,867

(22) Filed: Aug. 29, 2019

(65) Prior Publication Data

US 2020/0072639 A1    Mar. 5, 2020

(30) Foreign Application Priority Data

Aug. 29, 2018 (DE) .......................... 102018214601.2

(51) Int. Cl.
    *F16H 25/20*    (2006.01)
    *G01D 5/04*    (2006.01)
    *F16H 1/20*    (2006.01)

(52) U.S. Cl.
    CPC ................. *G01D 5/04* (2013.01); *F16H 1/20* (2013.01); *F16H 25/2015* (2013.01); *F16H 25/20* (2013.01); *F16H 2025/2062* (2013.01)

(58) Field of Classification Search
    CPC ......... G01D 5/04; F16H 1/20; F16H 25/2015; F16H 25/20; F16H 2025/2062
    See application file for complete search history.

(56) References Cited

U.S. PATENT DOCUMENTS

| 5,053,685 | A | * | 10/1991 | Bacchi | G05B 19/232 318/135 |
| 5,809,833 | A | * | 9/1998 | Newport | F16H 25/20 192/141 |
| 2010/0315031 | A1 | * | 12/2010 | Jensen | F16H 25/2015 318/627 |
| 2011/0298323 | A1 | * | 12/2011 | Brieschke | H02K 7/116 310/83 |
| 2016/0114098 | A1 | * | 4/2016 | Gao | F16H 25/20 604/67 |
| 2018/0031093 | A1 | * | 2/2018 | Seminel | F16H 57/01 |
| 2019/0381677 | A1 | * | 12/2019 | Kamon | B25J 9/106 |
| 2020/0132513 | A1 | * | 4/2020 | Fujisawa | B25J 13/088 |
| 2020/0284374 | A1 | * | 9/2020 | Heaney | B05B 3/0409 |
| 2020/0319224 | A1 | * | 10/2020 | Toyama | B25J 13/088 |

* cited by examiner

*Primary Examiner* — David M Fenstermacher
(74) *Attorney, Agent, or Firm* — Laurence A. Greenberg; Werner H. Stemer; Ralph E. Locher

(57) ABSTRACT

A linear system includes a linear unit and a motor adapted to drive the linear unit so as to perform a linear movement. A system for detecting the position of the linear unit includes an absolute encoder which is connected to the motor. The absolute encoder is configured so as to detect a position of the linear unit based on a movement of the motor.

10 Claims, 4 Drawing Sheets

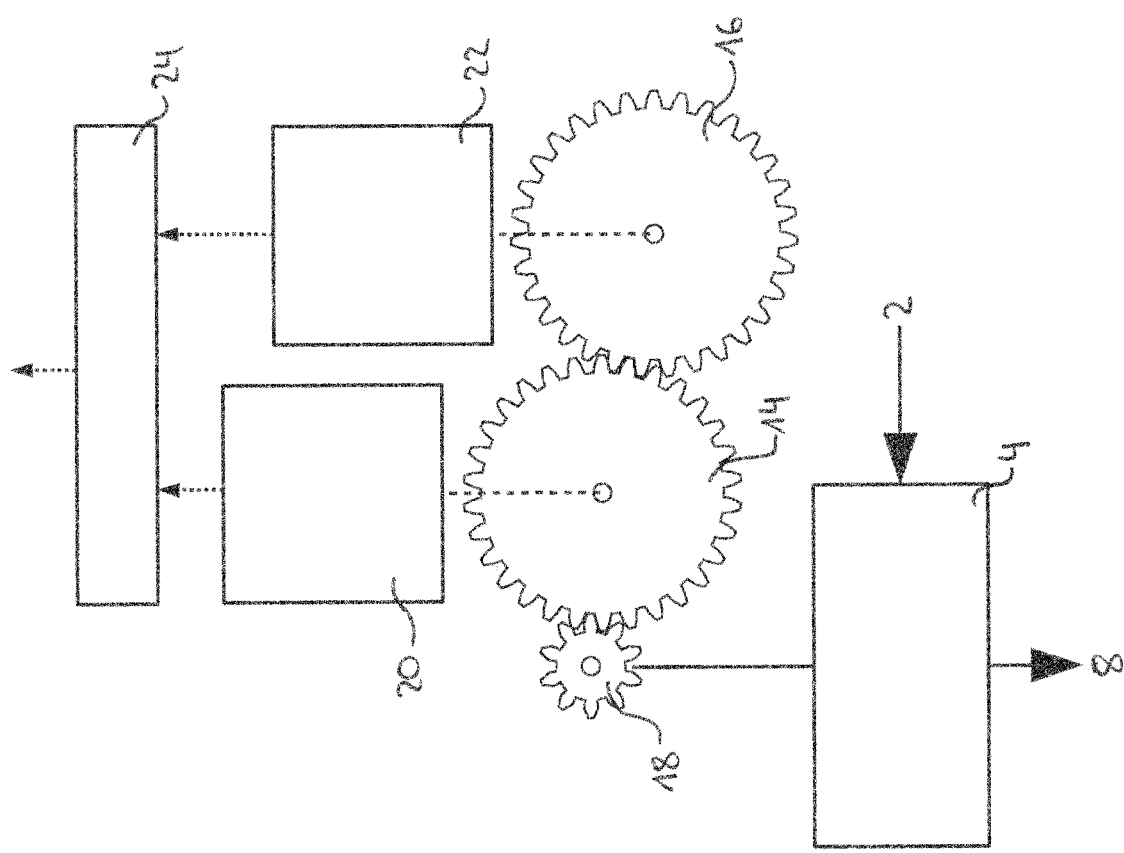

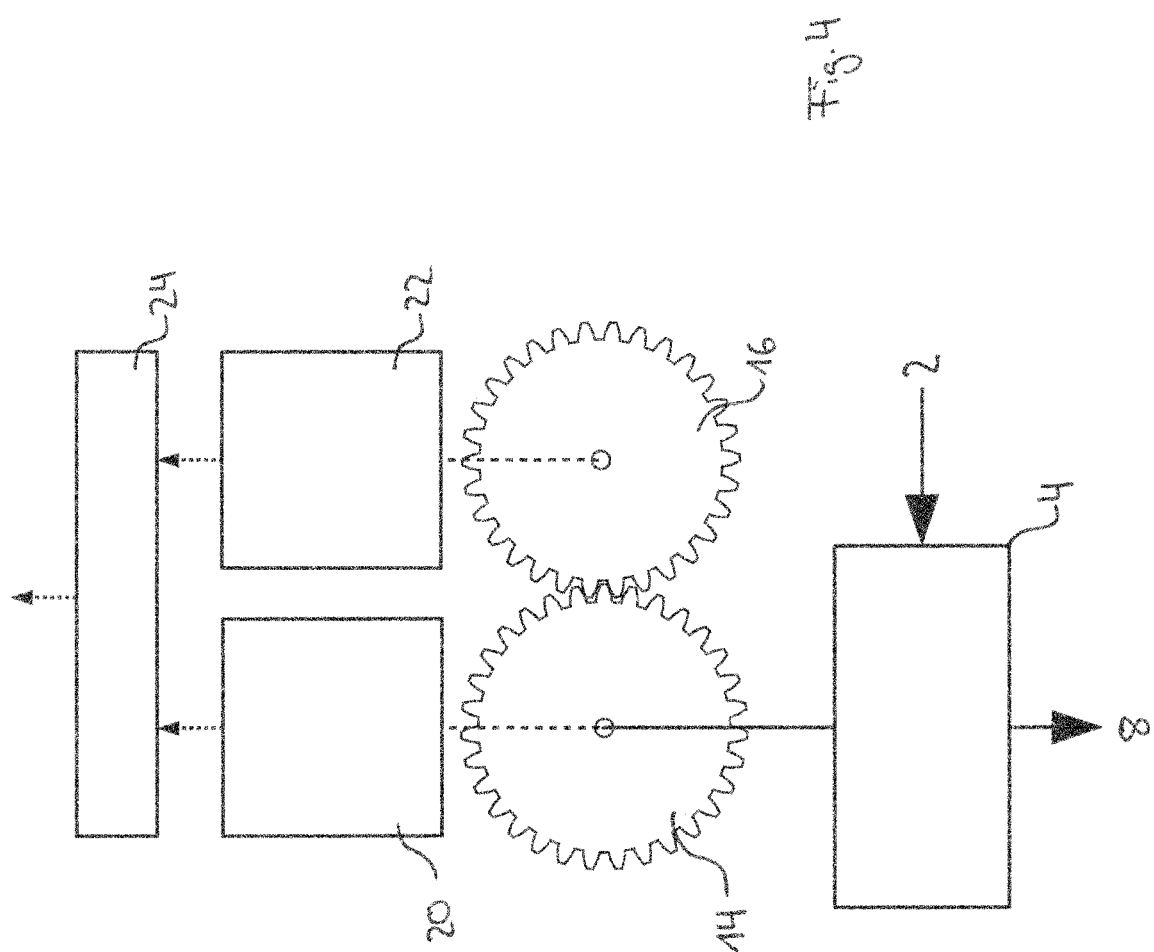

SYSTEM FOR DETECTING THE POSITION OF A LINEAR UNIT OF A LINEAR SYSTEM

CROSS-REFERENCE TO RELATED APPLICATION

This application claims the priority, under 35 U.S.C. § 119, of German Patent Application DE 10 2018 214 601.2, filed Aug. 29, 2018; the prior application is herewith incorporated by reference in its entirety.

BACKGROUND OF THE INVENTION

Field of the Invention

The present invention relates to a system for detecting the position of a linear unit of a linear system or linear actuator, in which the linear system has a motor and the motor is adapted to drive the linear unit so as to perform a linear movement.

In many technical systems, linear actuators or telescopic rods are used to perform linear movements. Electric linear actuators of that kind usually are formed of a motor and a gear unit driven by the motor, which exerts a rotational movement on a conversion element. The conversion element converts the rotational movement into a linear movement. The conversion element may, for example, be a spindle, chain, belt or rack.

Feedback through the position of a linear actuator may be required, for example, to electrically limit a mechanical path of the linear actuator, to enable precise positioning, or to provide other systems with information on the linear actuator's current position. Heretofore, such positional feedback signals have frequently been received through incremental encoders. However, those systems are cumbersome and require many components, making them cost-intensive. For example, an incremental encoder usually requires two sensors and a calculation unit and backup unit. When the linear unit moves, the two sensors emit two signals that are electrically phase-shifted by 90° and may be used to detect the distance and direction of travel of the linear unit. Based on the distance travelled and the direction of travel, the calculation unit may determine a position of the linear unit. The current position information may be lost at switch-off or in the event of a power failure. In order to prevent that, the backup unit may store the current position information. However, incremental encoders may have to be referenced again after switching on, because changes in position are not detected when the device is powered off.

SUMMARY OF THE INVENTION

It is accordingly an object of the invention to provide a system for detecting the position of a linear unit of a linear system, which overcomes the hereinafore-mentioned disadvantages of the heretofore-known systems of this general type and which does so in a simple and safe way.

With the foregoing and other objects in view there is provided, in accordance with the invention, a system for detecting the position of a linear unit of a linear system, in which the linear system includes a motor that is adapted to drive the linear unit directly or indirectly so as to perform a linear movement. The detection system includes an absolute encoder connected to the motor. The absolute encoder is constructed so as to detect a position of the linear unit based on a movement of the motor.

In contrast to systems that are known in the art, the proposed system uses an absolute encoder that is directly or indirectly connected to the motor and is constructed to detect a position of the linear unit based on a movement of the motor. Absolute encoders output position information in the form of a digital numerical value. This numerical value is unambiguous over the entire resolution range of the absolute encoder, and therefore no initial referencing is required, as is the case with the incremental encoders used heretofore.

The use of an absolute encoder also makes it possible to maintain the position of the linear unit even in the event of a power failure or switch-off. It is therefore not necessary to re-reference the absolute encoder after powering back on. A memory unit, which previous incremental encoders require, may therefore also be dispensed with. Moreover, the time required for installation and maintenance may be reduced, because the absolute encoder does not have to be repeatedly referenced. The reliability of the detection of the linear unit's position is also greatly improved.

A rotary encoder (or angle encoder) is a sensor for the angle of rotation that supplies output signals that are decoded in an evaluation device. An absolute encoder or absolute value encoder, as the term is used herein, outputs position information in the form of a digital numerical value. The position information may refer to a position information of the motor or to a gear unit connected to the motor, and thus indirectly to a position of the linear unit. Since this numerical value is unique over the entire resolution range of the absolute encoder, no initial reference run is required, as is the case for example with incremental encoders. Depending on the embodiment, the absolute encoder may only resolve one revolution and then start again at 0, or it may resolve multiple revolutions.

The linear system may be a nut-spindle system, which may be used for example in an actuator of a lifting column or a linear module. In addition, the linear system may be some kind of linear actuator in which a movement of the motor may be converted into a movement of the linear unit.

According to one embodiment, the linear system has a gear unit driven by the motor, and the motor is constructed to drive the linear unit through the gear unit. In this case, the absolute encoder is connected to the motor through the gear unit.

According to one embodiment, the absolute encoder is a multi-turn absolute encoder that is able to resolve multiple revolutions. In this case, the absolute revolution is detected within one revolution, as is the number of revolutions. In consequence, a multi-turn absolute encoder associates a coded position value with each angular position and each full revolution of the gear unit. A zero-setting or referencing may therefore be omitted. The absolute encoder generates information about the position, angle and number of revolutions of the gear unit.

In another embodiment, the absolute encoder may have a first and a second single-turn absolute encoder. In the single-turn embodiment, the absolute encoder measures the absolute revolution within one revolution. A multi-turn absolute encoder may be easily implemented by using two single-turn absolute encoders.

The positions of both single-turn absolute encoders are driven by the gear unit, by using a slight difference in gear reduction. This difference causes the difference between the two angles of the two single-turn absolute encoders to increase with each revolution. The number of revolutions may be calculated from this difference between the two angles, and thus the total angle may be calculated over multiple revolutions (multi-turn).

In addition, a multi-turn encoder may be realized, for example, by using a potentiometer, a single-turn absolute encoder in combination with a revolution counter and a memory, a single-turn absolute encoder in combination with a revolution counter and a battery, an incremental encoder in combination with a step counter and a memory, or an incremental encoder in combination with a step counter and a battery.

The absolute encoder may be connected to the motor or gear unit through at least a first and a second gearwheel. In one embodiment, these gearwheels may also be integrated directly into the gear unit. In particular, the first single-turn absolute encoder is connected to the first gearwheel and the second single-turn absolute encoder is connected to the second gearwheel. The two gearwheels transmit one respective movement of the motor and the gear unit to the two single-turn absolute encoders. A movement of the gearwheels is directly related to a movement of the linear unit.

The first gearwheel may have a first toothing and the second gearwheel may have a second toothing. Preferably, the difference between the number of teeth of the first toothing (N1) and the number of teeth of the second toothing (N2) is between 1 and 5, particularly between 1 and 2. The difference between N1 and N2 is preferably only one tooth, but if the number of teeth of N1 is very large, the difference may also be greater. As a result of this small difference in the number of teeth, a very small gear ratio may be realized. The difference between the detected angles of the first and second gearwheels is calculated. This difference will change very slowly due to the small difference in the number of teeth.

The use of two single-turn absolute encoders with two gearwheels with low gear ratios may reduce the space requirement compared to other implementations of a multi-turn absolute encoder that require high mechanical gear ratios. Such an implementation may also reduce costs compared to other implementations of a multi-turn absolute encoder, due to the smaller space requirement and the small number of gearwheels.

According to one embodiment, the motor or gear unit is coupled to the first and second gearwheels through a third gearwheel with a third toothing (N3). Through the use of the three gearwheels, a coupling is realized between the motor or gear unit and the absolute encoder. In one embodiment, this coupling may also be integrated inside the gear unit. The gear ratio between the first and third gearwheels is R1=N3/N1 and the gear ratio between the second and third gearwheels is R2=N3/N2.

The gear ratio of the coupling is then R=R1−R2=N3/N1−N3/N2.

With a difference in the number of teeth of 1, that is, N2=N1+1, the equation is: R=N3/(N1$^2$+N1).

As an example, the following toothings are assumed: N1=30, N2=31 and N3=10.

Thus, the gear ratio R1=10/30=1/3 and R2=10/31. The gear ratio of the coupling is therefore R=10/(30$^2$+30)=1/93.

In this example, a coupling with a gear ratio of 1/93 is easily implemented by two simple gearwheels with a gear ratio of 1/3. With the proposed system, many revolutions of the gear unit (and thus a large range of movement of the linear unit) may be resolved without requiring a high gear ratio of a coupling between the gear unit and the absolute encoder. This likewise leads to a reduced space requirement and thus to the above-described advantages.

According to one embodiment, the absolute encoder may be constructed to detect a movement of the motor or gear unit through a capacitive, magnetic, inductive and/or optical coupling.

In the case of an optical coupling, the gearwheels may be furnished with a plurality of code tracks that may be scanned in parallel with the aid of an optical element. In the case of a magnetic coupling, magnets may be furnished on the gearwheels, and these magnets may be detected by the absolute encoder during rotation of the gearwheels by using a magnetic coupling. In order to obtain a capacitive coupling, electrodes may be furnished on the gearwheels and on the absolute encoder, with a capacitance being changed when the electrodes are rotated relative to each other. The angular position may be inferred from this change in capacitance. This may be achieved analogously with inductive coupling and thus a change in inductance.

The absolute encoder is preferably connected through a capacitive or inductive coupling to gearwheels, for example the first and second gearwheels, which receive the movement of the gear unit. The use of a capacitive or inductive measurement is particularly cost-effective compared to optical or magnetic measurement.

As described above, the absolute encoder may detect a rotation of the gear unit by using an angular position of the gearwheels. According to another embodiment, the system has a calculation unit for converting the detected movement of the gear unit into a position of the linear unit. This calculation unit may convert the movement of the gear unit into a position of the linear unit, for example based on stored values.

In particular, the absolute encoder may detect an angular position of the first and second gearwheels and the calculation unit may convert these angular positions into a position of the linear unit. For example, a position of the linear unit may be stored for each angular position or for each combination of angular positions of the two gearwheels. In one embodiment, the calculation unit may also detect and store a respective angular position of the two gearwheels at a zero point of the linear unit, i.e. in a completely retracted or completely extended state of the linear unit. A change in the angular positions due to movement of the linear unit may then be recognized and calculated in the calculation unit as a change in the position of the linear unit.

Additional advantages and advantageous embodiments are set forth in the description, drawings and claims. In particular, the combinations of features indicated in the description and in the drawings are purely exemplary; the features may also be present individually or combined in other ways.

Although the invention is illustrated and described herein as embodied in a system for detecting the position of a linear unit of a linear system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. In the following, the invention will be described in greater detail with reference to the exemplary embodiments shown in the drawings. The exemplary embodiments and the combinations shown in the exemplary embodiments are purely exemplary, and are not intended to define the invention's claimed scope. The invention's scope is defined solely by the appended Claims. Other features which are considered as characteristic for the invention are set forth in the appended claims.

BRIEF DESCRIPTION OF THE SEVERAL VIEWS OF THE DRAWING

FIG. 3 is a schematic and block diagram of a second embodiment of the system for detecting the position of a linear unit of FIG. 1; and FIG. 4 is a schematic and block diagram of a third embodiment of the system for detecting the position of a linear unit of FIG. 1.

DETAILED DESCRIPTION OF THE INVENTION

Figure 1:
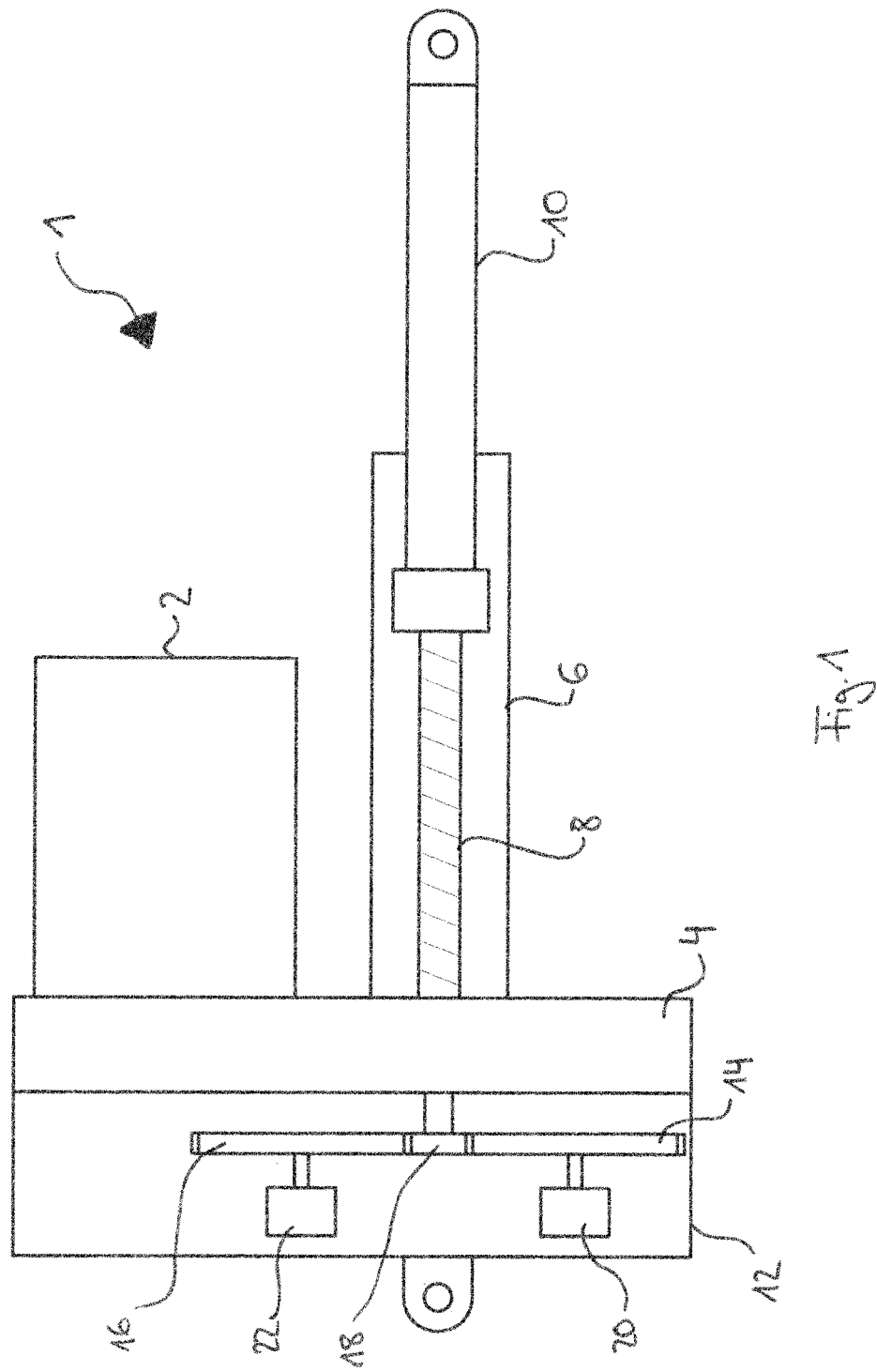
FIG. 1 is a schematic and block diagram of a linear actuator with a system for detecting the position of a linear unit.

Referring now in detail to the figures of the drawings, in which identical or functionally equivalent elements are indicated with the same reference signs, and first, particularly, to FIG. 1 thereof, there is seen a system 1 for detecting the position of a linear unit 10 of a linear system, in this case a linear actuator 6. A motor 2 is coupled to a gear unit 4 that drives the linear actuator 6. Alternatively, the motor 2 may also be coupled directly to the linear actuator 6. In this case, the linear actuator 6 is formed of a spindle 8 and the linear unit 10. The gear unit 4 sets the spindle 8 into rotational movement and the spindle 8 converts the rotational movement into a linear movement of the linear unit 10. Instead of a spindle 8, any other type of conversion element may be used, for example a belt or a gearwheel.

The gear unit 4 is also connected to an absolute encoder 20, 22 through a position determination unit 12. The position determination unit 12 may be constructed integrally with the gear unit 4 as a gear train or as a coupling between the gear and the absolute encoder 20, 22.

The absolute encoder 20, 22 may, as in this case, be realized by two single-turn absolute encoders 20, 22. The position of the linear unit 10 may be ascertained through the coupling of the gear unit 4 with the absolute encoder 20, 22. This position may be used to electrically limit a mechanical path of the linear actuator 6, to enable precise positioning, or to provide other systems with information about the current position of the linear actuator 6.

In the embodiment shown herein, the position determination unit 12 for coupling the gear unit 4 with the absolute encoder 20, 22 is formed of three gearwheels 14, 16, 18, of which a first gearwheel 14 is coupled with the first single-turn absolute encoder 20 and a second gearwheel 16 is coupled with the second single-turn absolute encoder 22. The gear unit 4 itself drives a third gearwheel 18, which sets the other two gearwheels 14, 16 in rotation. The third gearwheel 18 may move in direct relation with the spindle 8. The two single-turn absolute encoders 20, 22 detect an angular position of the two gearwheels 14, 16, for example through a capacitive coupling. These angular positions respectively correspond to a position of the linear unit 10, so that this position may be precisely determined by the absolute encoders 20, 22.

Figure 2:
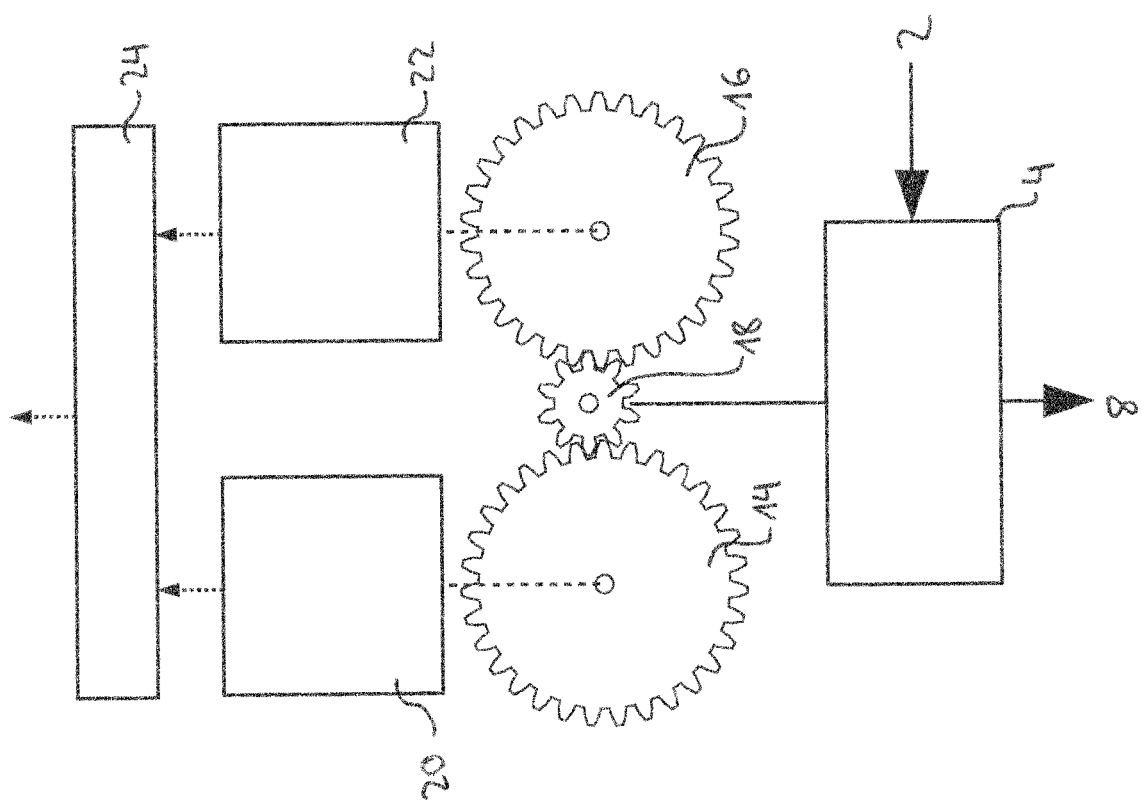
FIG. 2 is a schematic and block diagram of a first embodiment of the system for detecting the position of a linear unit of FIG. 1.

FIGS. 2 to 4 show three exemplary implementations of the position determination unit 12, although other implementations are also possible.

FIG. 2 shows a schematic view of the implementation of the position determination unit 12 of FIG. 1. The position determination unit 12 in this case likewise is formed of three gearwheels 14, 16, 18. The first gearwheel 14 is coupled to the first single-turn absolute encoder 20 and the second gearwheel 16 is coupled to the second single-turn absolute encoder 22. The gear unit 4 itself drives the third gearwheel 18, which is disposed between the two other gearwheels 14, 16 and sets these respective wheels in rotation.

The two single-turn absolute encoders 20, 22 each respectively detect an angular position of the first or second gearwheel 14, 16 and transmit this angular position to a calculation unit 24. The calculation unit 24 may then convert these angular positions into a position of the linear unit 10.

As an alternative to the configuration of FIG. 2, the third gearwheel 18 may be coupled with only one of the gearwheels 14, 16, as shown in FIG. 3. In this case, the gear unit 4 is coupled with the third gearwheel 18, the rotation of which rotates the first gearwheel 14. A rotation of the first gearwheel 14 is in turn translated into a rotation of the second gearwheel 16, because these two gearwheels mesh with each other.

In addition, it is possible that only two gearwheels 14, 16 may be used for the position determination unit 12, as shown in FIG. 4. The gear unit 4 in this case is directly coupled to the first gearwheel 14, which transfers its rotation to the second gearwheel 16. In this case, too, the two single-turn absolute encoders 20, 22 are coupled to the gearwheels 14, 16 and detect the angular positions thereof.

In the embodiments shown herein and discussed above, the absolute encoder is constructed as two respective single-turn absolute encoders 20, 22. Alternatively, other implementations of absolute encoders may be used, for example a multi-turn absolute encoder or more than two single-turn absolute encoders.

The proposed system makes it possible to maintain the position of a linear unit even in the event of a power failure or switch-off, because an absolute encoder is used that does not require re-referencing when it is switched on again.

The following is a summary list of reference numerals and the corresponding structure used in the above description of the invention:

1 System
2 Motor
4 Gear unit
6 Actuator
8 Spindle
10 Linear unit
12 Position determination unit
14 First gearwheel
16 Second gearwheel
18 Third gearwheel
20 Absolute encoder
22 Absolute encoder
24 Calculation unit

The invention claimed is:

1. In a linear system including a linear unit and a motor adapted to drive the linear unit to perform a linear movement, a system for detecting a position of the linear unit, the system comprising:
   a multi-turn absolute encoder connected to the motor, said absolute encoder being configured to detect the position of the linear unit based on a movement of the motor.

2. The system according to claim 1, wherein the linear system has a gear unit driven by the motor, the motor is adapted to drive the linear unit through the gear unit, and said absolute encoder is connected through the gear unit to the motor.

3. The system according to claim 1, wherein said absolute encoder includes first and second single-turn absolute encoders.

4. The system according to claim 1, which further comprises at least first and second gearwheels connecting said absolute encoder to the motor.

5. The system according to claim 3, which further comprises at least first and second gearwheels connecting said single-turn absolute encoders to the motor, said first single-turn absolute encoder being connected to said first gearwheel and said second single-turn absolute encoder being connected to said second gearwheel.

6. The system according to claim 4, wherein said first gearwheel has a first toothing with a number of teeth, said second gearwheel has a second toothing with a number of teeth, and a difference between said number of teeth of said first toothing and said number of teeth of said second toothing is between 1 and 5.

7. The system according to claim 5, wherein said first gearwheel has a first toothing with a number of teeth, said second gearwheel has a second toothing with a number of teeth, and a difference between said number of teeth of said first toothing and said number of teeth of said second toothing is between 1 and 5.

8. The system according to claim 1, wherein said absolute encoder is adapted to detect a movement of the motor through at least one of a capacitive, magnetic, inductive or optical coupling.

9. The system according to claim 1, which further comprises a calculation unit adapted to convert a movement of the motor detected by said absolute encoder into a position of the linear unit.

10. The system according to claim 1, wherein the linear system has a gear unit driven by the motor, and said multi-turn absolute encoder generates information about a position, an angle and a number of revolutions of said gear unit.

* * * * *